Dec. 29, 1925.

R. P. DODDS 1,567,925

CLOCK MOUNTING

Filed July 30, 1924

2 Sheets-Sheet 1

Inventor:
Robert P. Dodds,
by Dodge and Sons,
Attorneys.

Dec. 29, 1925.

R. P. DODDS 1,567,925

CLOCK MOUNTING

Filed July 30, 1924

2 Sheets-Sheet 2

Inventor
Robert P. Dodds,
Attorneys

Patented Dec. 29, 1925.

1,567,925

UNITED STATES PATENT OFFICE.

ROBERT P. DODDS, OF TROY, NEW YORK, ASSIGNOR TO W. & L. E. GURLEY, OF TROY, NEW YORK, A CORPORATION OF NEW YORK.

CLOCK MOUNTING.

Application filed July 30, 1924. Serial No. 729,141.

*To all whom it may concern:*

Be it known that I, ROBERT P. DODDS, a citizen of the United States, residing at Troy, in the county of Rensselaer and State of New York, have invented certain new and useful Improvements in Clock Mountings, of which the following is a specification.

This invention pertains to clock mountings, and has to do more particularly with a new and improved means for attaching and securing the clock to the casing of an instrument, and to the means employed for connecting the main shaft of the clock to a rotatable portion of the instrument, as, for instance, the shaft of the register drum of a water level recorder or register.

The invention will be hereinafter described as applied to a water stage recorder or register but it is to be understood that the use of such terms, recorder or register, are not to be considered as terms of limitation and the specification and claims are to be interpreted in light of this statement.

Under the practice now usually in vogue, the rear face of the clock casing and the face of the register casing to which the clock is directly secured are faced off to render them true and the clock is secured in place by machine screws. It is also necessary to employ, under this arrangement, a compensating or flexible joint or coupling between the clock shaft and that of the recorder. With such arrangement the securing of the clock in place frequently warps the clock casing and as a consequence the clock is thrown out of time and in some instances caused to stop. Substitution or replacement of the clock upon an instrument in the field often has to be done by an unskilled person, and this element leads to further failures.

The present invention has for its object the production of a clock mounting and connection such that the difficulties above noted are obviated and the facing of parts and the employment of a universal or flexible coupling is done away with. Furthermore, the construction is such that any unskilled person may readily dismount a clock and substitute another therefor with the certainty that the latter will not be placed under any strain whatsoever and will continue to properly function.

Figure 1:
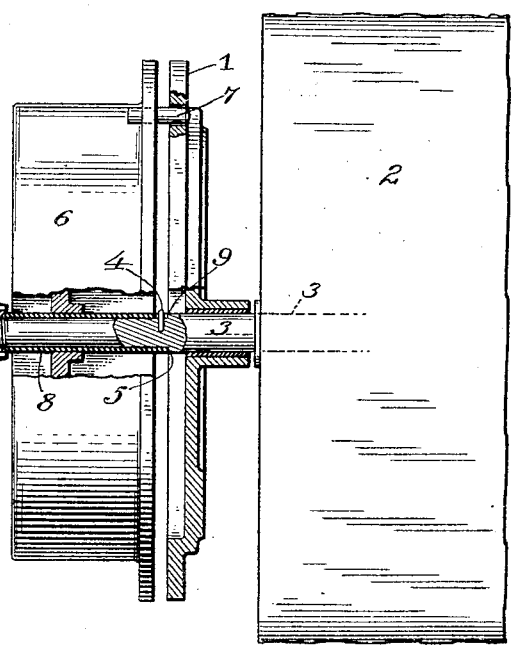
Figure 2:
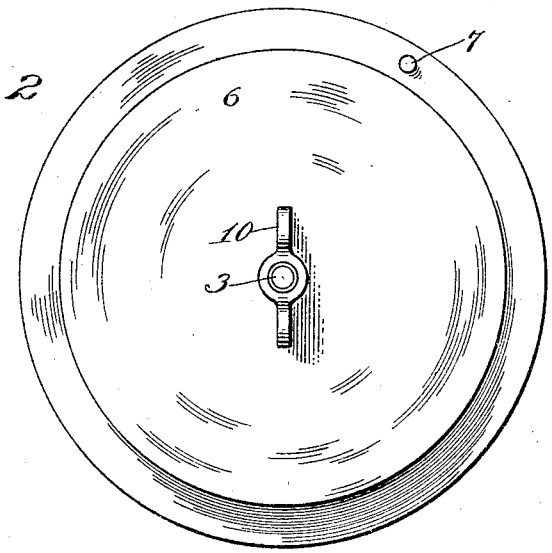

Two embodiments of my invention are illustrated in the annexed drawings, wherein:

Fig. 1 is a sectional elevation of a clock and so much of a register as is necessary to a full understanding of the invention, and Fig. 2 a face view of the clock.

Figure 3:
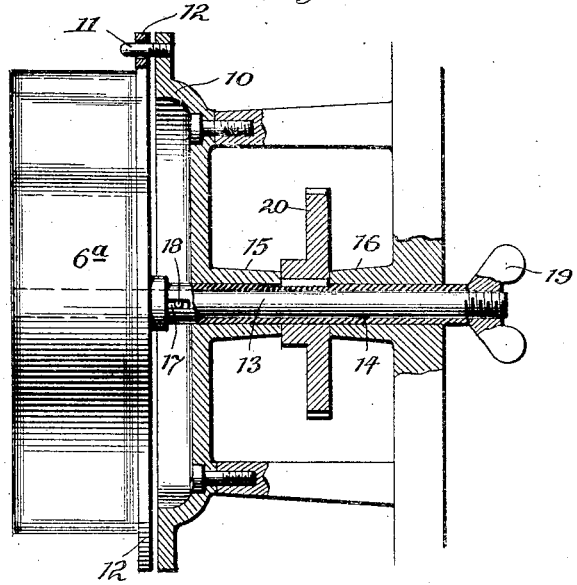

Fig. 3 a sectional elevation of a modified arrangement, and

Figure 4:
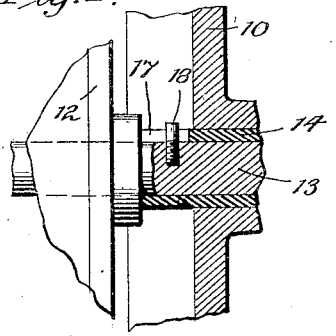

Fig. 4 an enlarged detail sectional view.

Referring first to Figs. 1 and 2, a section or portion of the register casing is denoted by 1 and is designed to be secured to the main casing (not shown) in any suitable manner. The register drum is shown in part at 2 and its shaft at 3. Said shaft passes freely through an opening formed in section 1 and its outer portion is slightly reduced in diameter and its outer end is threaded. A laterally extending pin 4 is secured in the shaft adjacent the outer face of section 1 or adjacent a shoulder 5 formed by reducing the shaft as noted. The clock and its case are denoted by 6 and a pin 7 is secured in the flange of the clock casing, said pin projecting rearwardly from the flange of the clock casing and passing freely into an opening formed in the member 1. The pin may, however, be secured in the member 1.

The main driving shaft 8 of the clock is hollow or has the form of a tube and is designed to be slipped over shaft 3, said shaft 8 having a slot or notch 9 at its inner or rear end into which the pin 4 passes when the clock is positioned.

A wing nut or other equivalent securing device 10 screwed upon the outer end of shaft 3 takes against the outer end of shaft 8 and prevents outward movement of the clock relatively to the shaft.

The inter-engagement of the tubular clock shaft with pin 4 carried by shaft 3 causes said shafts to rotate as one, and pin 7 locks the clock and the member 1 of the register against angular movement.

In Fig. 3 and 4 a modified arrangement is disclosed. Under this construction the clock 6ª is secured against angular movement with reference to the extension 10 of the register casing by a pin 11 secured to casing extension, the pin passing freely through a hole formed in the flange 12 of the clock.

The clock in this instance is provided with a shaft 13, which, when the parts are positioned, passes through a tubular shaft or sleeve 14 which is journalled for rotation in suitable bearings as 15 and 16 on the frame.

The forward end of said sleeve is notched as at 17 for the reception of a pin 18 secured to the clock shaft, the engagement of the parts causing the two shafts or elements to rotate as one. Shaft 13 at its inner end is threaded and a nut 19 is mounted thereon, the nut acting against the inner end of tubular shaft 14 and drawing the parts to place, causing the pin 11 to pass into the opening in the clock flange and the pin 18 to pass into slot 17.

A gear 20 is secured to shaft 14 and imparts movement from the clock to a suitable train, or directly to the element of the register which is to be rotated through the agency of the clock.

As will be readily appreciated, the clock may be readily dismounted and a substitute as readily replaced, and this by an unskilled person. Moreover, the parts with the mounting above described are not placed under any strain whatsoever, this more particularly by reason of the fact that the shaft elements under both arrangements described prevent the clock casing from being forced into contact with the frame of the register. In other words, the clock may be said to be sustained by and on its driven shaft without any other fastening means.

What I claim is:

1. In combination with a casing; a shaft extending outwardly therefrom; a clock; a tubular driving shaft forming a part of the clock mechanism, said tubular shaft being mounted upon the first named shaft, said shaft forming the support to the clock with reference to the casing; means producing an interlock between said shafts; and means to hold the clock case against rotation.

2. In combination with a casing; a shaft extending outwardly therefrom; a clock; a tubular driving shaft forming a part of the clock mechanism, said shaft having a notch formed at its inner end; a pin extending outwardly from the first named shaft and passing into the notch; a nut mounted on the outer end of the first named shaft and bearing against the outer end of the tubular shaft; and means to hold the clock against angular movement with reference to the casing.

3. In combination with a casing; a shaft extending outwardly therefrom; a clock; a tubular driving shaft forming a part of the clock mechanism, said shaft having a notch formed at its inner end; a pin extending outwardly from the first named shaft and passing into the notch; a nut mounted on the outer end of the first named shaft and bearing against the outer end of the tubular shaft; and a pin extending rearwardly from the clock and passing freely into an opening formed in the casing.

4. In combination with a casing; a shaft to be driven extending outwardly therefrom; a clock having a hollow shaft forming a part of the clock mechanism, said shaft being designed to be slipped over the first named shaft; and means acting as the clock is moved to position with reference to the casing to effect an interlock between the shafts and an interlock between the clock and the casing.

5. In combination with a casing; a clock provided with a driving shaft, said shaft forming the sole support for the clock with reference to the casing; a shaft to be driven; means effecting an interlock between said shafts; and means for holding the clock against angular movement with reference to the casing.

6. In combination with a casing; a clock provided with a driving shaft, said shaft forming the sole support for the clock with reference to the casing; a shaft to be driven; and means serving to hold the shafts in interlocked relation, said means also acting as a stop to prevent the clock from being brought into contact with the casing.

7. In combination with a casing; a clock provided with a driving shaft and through which the clock is solely supported with reference to the casing; a shaft to be driven; means serving to hold the shafts in interlocked relation, said means also acting as a stop to prevent the clock from being brought into contact with the casing, and means for holding the clock against angular movement with reference to the casing.

8. In combination with a casing; a clock provided with a driving shaft and through which the clock is solely supported with reference to the casing; a shaft to be driven; means serving to hold the shafts in interlocked relation, said means also acting as a stop to prevent the clock from being brought into contact with the casing; and a pin secured to the casing and extending into an opening formed in the clock casing for holding the clock against angular movement with reference to the casing.

9. In combination with a casing; a clock;

a pair of telescoping shafts, one being driven by the clock and the other having its bearing in the casing; means for interlocking said shafts to cause them to rotate in unison; and means to hold the clock against angular movement with reference to the casing, the clock being solely supported with reference to the casing by the driven shaft.

10. In a recorder, the combination of a casing; a clock provided with a driving shaft through which the clock is solely supported with reference to the casing; and means for preventing angular movement of the clock with reference to the casing.

In testimony whereof I have signed my name to this specification.

ROBERT P. DODDS.